L. R. McDONALD.
VARIABLE AMPLITUDE OF VIBRATION MOTOR AND METHOD.
APPLICATION FILED DEC. 29, 1916.
1,396,337.
Patented Nov. 8, 1921.
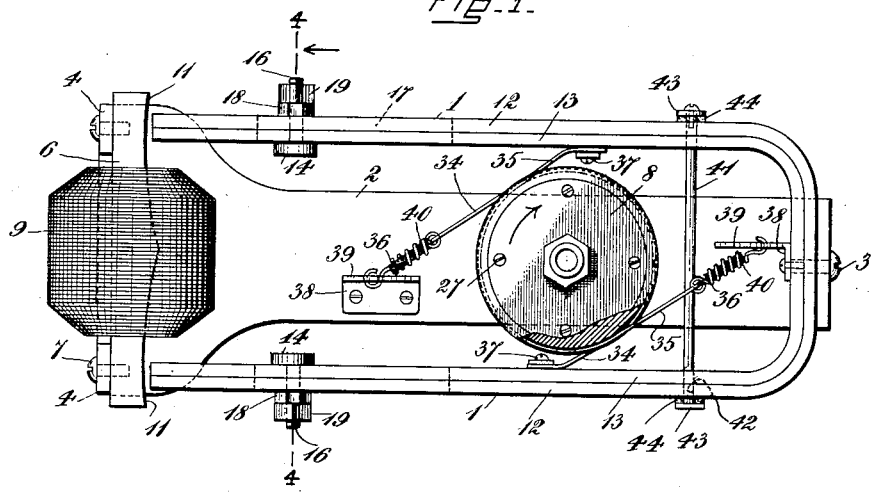
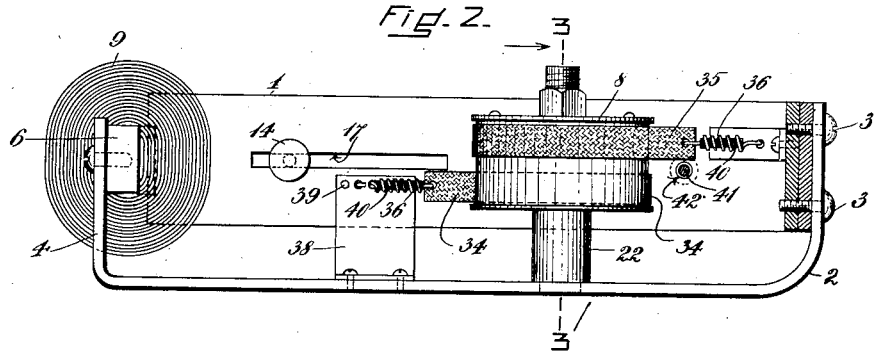
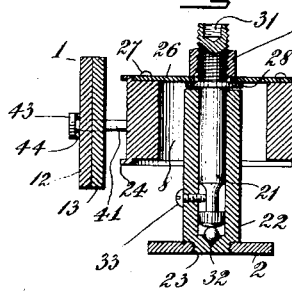
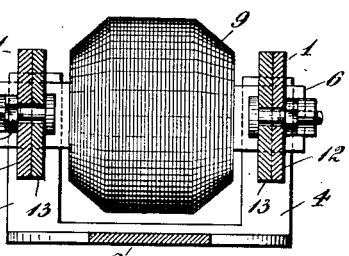
INVENTOR=
LESLIE R. McDONALD
BY Roberts Roberts & Cushman
HIS ATTORNEYS=

UNITED STATES PATENT OFFICE.

LESLIE R. McDONALD, OF MONTREAL, QUEBEC, CANADA, ASSIGNOR TO MARGUERITE V. O'LEARY, OF MONTREAL, QUEBEC, CANADA.

VARIABLE AMPLITUDE OF VIBRATION-MOTOR AND METHOD.

1,396,337.     Specification of Letters Patent.     Patented Nov. 8, 1921.

Application filed December 29, 1916. Serial No. 139,448.

*To all whom it may concern:*

Be it known that I, LESLIE R. MCDONALD, a citizen of the United States, and resident of Montreal, in the Province of Quebec and Dominion of Canada, have invented new and useful Improvements in Variable Amplitude of Vibration-Motors and Methods, of which the following is a specification.

This invention relates to a motor comprising one or more vibratory members and to a method of and means for regulating the speed of a motor of this type. More particularly the invention relates to an electric motor comprising a rotary member, oscillatory means making frictional engagement with the rotary member when moving in one direction for continuously rotating the member, and means to produce a regularly varying magnetic field having a frequency of variation substantially equal to the natural frequency of oscillation of the oscillatory means for actuating the oscillatory means.

A motor of this character is simple, durable and highly efficient. It is adapted to produce a large torque at a relatively low angular velocity and is adapted to be operated by vibratory current such as, for example, the ordinary commercial current alternating at sixty cycles per second. Such a motor is particularly useful for operating phonographs, advertising devices, display tables, and the like, where it is desirable to employ commercial alternating current to drive the apparatus at comparatively low speed. The motor obviates the usual transmission mechanism for transforming high velocity rotation into low velocity rotation, the low velocity rotation being produced directly and far more efficiently.

One object of this invention is to provide a method of and means for controlling the angular velocity of the driven member of the motor by varying the amplitude of vibration, without substantially varying the rate of vibration, of the driving member or members of the motor. Another object is to provide a vibratory member consisting of magnetic and non-magnetic parts secured together in such manner that a vibratory magnetic flux flowing through the member in the proper direction, preferably longitudinally, will vibrate the member. Another object is to provide a motor having a plurality of vibratory members, a rotary member and a plurality of belts or other suitable means respectively connected to the vibratory members and arranged conjunctively to drive the rotary member. And still another object is to reduce the noise in apparatus of the character described, particularly in the coiled spring employed therein.

Other objects of the invention will be apparent from the following description and the accompanying drawings, in which,—

Figure 1 is a plan view of the apparatus, a part being broken away;

Fig. 2 is a side elevation of the apparatus, parts being shown in section;

Fig. 3 is a transverse section taken on the line 3—3 of Fig. 2, parts being omitted; and Fig. 4 is a transverse section taken on the line 4—4 of Fig. 1, parts being omitted.

The particular embodiment of my invention herein disclosed comprises vibratory members 1 arranged in the form of a tuning fork and mounted on one end of the U-shaped supporting member 2 by means of machine screws 3. The U-shaped supporting member 2 is laterally flared at the other end and is provided with two spaced upturned portions 4 to which is secured the armature 6 by means of machine screws 7. The rotary member 8, driven by the vibratory members 1 as hereinafter described, is mounted on the member 2 intermediate its ends and intermediate the vibratory members.

The electromagnet for actuating the vibratory members preferably comprises a field coil 9, surrounding the armature 6 as illustrated, although the field coil may surround any portion of the substantially closed magnetic circuit formed by the armature 6 and the tuning fork as, for example, the base of the tuning fork intermediate the two vibratory members 1. Each end of the armature is provided with a pole face 11, which has a radius of curvature substantially equal to the length of the respective vibratory members, and whose center of curvature is substantially at the fixed end of the corresponding vibratory member, so that the length of the air gaps between the vibratory members and the armature remain substantially constant as the vibratory members move to and fro along the arcuate faces 11.

The vibratory members comprise two straps of metal brazed or otherwise secured together, preferably only at their ends, the outside strap 12 being formed of magnetic material and the inside strap 13 being formed of non-magnetic material, suitable materials comprising iron and brass, respectively. However, any two materials having a different degree of magnetic permeability may be employed, the principal requirement being that one portion have a permeability which is high as compared with the permeability of the other portion.

In order to vary the amplitude of vibration of the vibratory members and also to control their period of vibration, weights 14 are preferably mounted on the respective members. Each of these weights comprises a bolt 16 passing through a slot 17 in the vibratory member, and having threaded on its outer end a lock nut 18 and a second nut 19. A number of nuts of different thickness and weight are preferably provided, so that by changing the outer nut 19 the effective weight of the vibratory members may be adjusted. The effective weight of the vibratory members may also be varied by longitudinally changing the position of the weights along the slots 17.

Another means for assisting in controlling the amplitude of vibration of the vibratory members comprises a rod 41, extending through opposed openings 42 in the vibratory members, and being provided on the ends with heads 43 covered on their inner faces with felt washers 44 or other cushioning material. These stops may be disposed anywhere along the tuning fork but they are preferably disposed near the fixed ends of the vibratory members. The distance between the heads 43 is made adjustable by any suitable means, Fig. 1, showing by way of illustration a set screw for one of the heads.

The rotary portion of the motor comprises a pulley 8 mounted on a shaft 21 which rotates in the bearing 22 threaded into the opening 23 of U-shaped supporting member 2. The pulley 8 is preferably made in the form of a cylinder of considerable thickness in order to afford sufficient weight for the pulley also to function as a fly-wheel. Around the edges of the pulley are provided raised portions 24 to serve as guides for the pulley belts, and on the upper side of the pulley is secured, by means of screws 27, a disk 26 having an aperture in the center thereof to receive the shaft 21. The shaft 21 is provided with a flange 28, and has the portion thereof extending above the flange threaded to receive a nut 29 for clamping the disk 26 between the flange and the nut. The upper end of the shaft is internally threaded at 31 to provide means for connecting the rotary portion of the motor with the device to be driven thereby. The lower end of the bearing is recessed to receive the ball bearing 32 provided to support the shaft 21. The shaft is provided with a groove cooperating with a machine screw 33 which is threaded through the bearing to prevent the shaft from being accidentally withdrawn from the bearing.

One means by which the vibratory members 1 may be caused to produce rotation of the rotary member comprises two belts 34 and 35, contacting with portions of the periphery of the pulley 8, secured at one end to the vibratory members 1 and at the other end to a spring 36, although a single belt may be employed, if desired, instead of a plurality of belts. The means for connecting the belts to the vibratory members comprise machine screws and washers 37 and the means for attaching the belts to the frame of the motor comprise brackets 38 having series of openings 39 through which the ends of the springs 36 are adapted to fit. The springs are attached to the belts in any suitable manner and are normally under a certain amount of tension. Within each of the coiled springs is provided cushioning means, preferably in the form of a cylinder of felt or felt-like material 40, fitting snugly within the cylindrical spring, whereby the noise produced by the expansion and contraction of the springs is greatly reduced, if not entirely eliminated.

When an alternating or pulsating current is caused to flow through the coil 9, a pulsatory flux is caused to flow through the armature 6 across the air-gaps and through the outer magnetic portion 12 of the vibratory members. Owing to the hysteretic effect produced upon the magnetic portion of the vibratory members by the pulsations of magnetic flux, the vibratory members are caused to vibrate to and fro in synchronism with the variations of current and flux, the vibratory members preferably having a period of vibration substantially equal to the period of variation of the flux and current. This action I believe to be due to the fact that the lines of force through the magnetic portion of the vibratory members causes the molecules of metal to arrange themselves longitudinally, thus causing an elongation of the magnetic portion of the vibratory members, and owing to the fact that comparatively little flux passes through the non-magnetic portion 13 of the vibratory members, this portion is little, if any, affected by the variations of the flux. Thus as the flux increases in intensity throughout the magnetic portion of the vibratory members, the said portions increase in length, and being on the outside of the fork the members are caused to move together. As the flux decreases the resiliency of the vibratory members causes them to move apart, and as the flux increases again, either in the same or in the opposite direction, the members are again caused to move inwardly, this action continuing in synchronism with the variations of magnetic flux.

As the vibratory members move apart the belts are reciprocated against the tension of springs 36, causing the rotary member to rotate in the direction of the arrow (Fig. 1). As the vibratory members move toward each other the pull on the respective belts is released, and the springs reciprocate the belts in the opposite direction. The springs are so tensioned, however, that they do not pull the belts as rapidly as the opposite ends of the belts are released by the vibratory members moving together. Thus the belts are not drawn tightly against the pulley as they are reciprocated by the springs but on the contrary they slide loosely over the smooth surface of the pulley and there is comparatively little tendency to produce rotation of the member in the direction opposite to the arrow. In other words, the members 1, vibrating at a frequency of one hundred and twenty cycles per second, for example, move toward each other so rapidly that the tension on each belt is released more quickly than it can be taken up by the respective relatively slow-acting springs, and the pressure between the belts and the rotary member is therefore negligible while the springs are moving the belts into retracted position. However, the springs are so tensioned that the time lag is very slight and as the vibratory members reverse their direction of movement the springs tension the belts so that they are again advanced under tension as the vibratory members move apart, thereby imparting another impulse to the rotary member in the direction of the arrow. Inasmuch as these impulses occur at a frequency of one hundred and twenty cycles per second, when using ordinary sixty-cycle current, and inasmuch as the rotary member has considerable inertia, the rotary member may be caused to rotate at substantially uniform velocity.

The supporting member 2 may be formed of brass, hard-rubber, or other non-magnetic material, if desired, so as not to form a magnetic shunt around the armature 11.

The angular velocity of the rotary member varies directly with the amplitude of vibration of the vibratory members. The amplitude of vibration varies directly with the mangnitude of the weight of the vibratory members up to the point where the weight is just large enough to give the vibratory members a period of vibration equal to the period of the pulsating or alternating magnetic field, or other impelling force, and above this point the amplitude of vibration varies inversely as the magnitude of the weight. The effect of moving the weight or weights toward the free ends of the vibratory members is the same as increasing the magnitude of the weight. The effect of the stop is to limit the amplitude of vibration of the vibratory members, thereby to reduce the angular velocity of the rotary member. Thus the angular velocity varies both directly and inversely with the weight and with the position of the weight and directly as the distance between the stops 44.

Thus the speed of the rotary member may be varied by regulating the amplitude of vibration of the vibratory members without substantially changing their rate of vibration, whereby the vibratory members may be kept in synchronism with the regular varying magnetic field throughout variation in the output speed of the motor.

The term "continuously rotating" has been employed in the claims particularly to signify that the rotation of the driven member is continuously in the same direction, although in fact the rotation is also continuous in the sense that it is unbroken. Furthermore, the rotation can be made substantially constant in velocity as well as continuous. The term "oscillatory means" may include either the belts or the tuning fork prongs or both.

This application is in part a continuation of the application filed June 16, 1916 under Sr. No. 104,095, as are also those applied for under Serial No. 139,333, filed December 29, 1916, and shown in Patent 1,290,264 patented January 7, 1919.

What I claim is:

1. Motor apparatus comprising vibratory members in the form of a tuning fork, means associated with the vibratory members so as to be driven thereby, means for vibrating said members at substantially their natural frequency, a rod extending through opposing openings in the vibratory members, and heads on the ends of the rod to limit the outward movement of the vibratory members, thereby to control the velocity of said driven means.

2. Motor apparatus comprising a vibratory member having a magnetic portion and a portion of different magnetic properties, and means for directing a varying magnetic flux through the vibratory member in such manner as to vibrate the member.

3. Motor apparatus comprising a vibratory member having a portion of high magnetic permeability and a portion of relatively low magnetic permeability, the two portions being arranged in parallel planes and connected to each other at least at one end, means for directing a magnetic flux through said portions in parallelism with said planes, and means for varying the intensity of the magnetic flux, thereby to vibrate said member.

4. Motor apparatus comprising a vibratory member having a portion of high magnetic permeability and a portion of relatively low magnetic permeability, the two portions being rigidly mounted at one end and being connected together at least at the other end, a magnetic circuit arranged lengthwise of said member so that the vibratory member forms a part of the circuit, the magnetic circuit having a pole piece disposed along the path of vibration of the vibratory member with a gap between the said member and the pole piece, and means to create varying magnetic flux in said circuit, thereby to vibrate said vibratory member.

5. Motor apparatus comprising a vibratory member having a portion of high magnetic permeability and a portion of relatively low magnetic permeability, the two portions being rigidly mounted at one end and being connected together at least at the other end, a magnetic circuit arranged lengthwise of said member so that the vibratory member forms a part of the circuit, the magnetic circuit having a pole piece disposed along the path of vibration of the vibratory member with a gap between the said member and the pole piece, the portion of the magnetic circuit adjacent said gap being arranged approximately longitudinally of said path of vibration, and means to create varying magnetic flux in said circuit, thereby to vibrate said vibratory member.

6. Motor apparatus comprising an elongate vibratory member having a longitudinal portion of high magnetic permeability and a longitudinal portion of relatively low magnetic permeability, the two portions being mounted in parallel planes and being connected together near their free ends, a substantially closed magnetic circuit arranged lengthwise of said member so that the vibratory member forms a part of the circuit, the magnetic circuit having a pole piece disposed in substantially perpendicular relationship to said planes in proximity to the free end of the vibratory member, and means to create a varying magnetic flux in said circuit, thereby to vibrate said vibratory member.

7. Motor apparatus comprising a vibratory means in the form of a tuning fork, said means consisting of an outer band of magnetic material and an inner band of non-magnetic material, the two bands being connected together in the regions of their free ends, a magnetic pole piece disposed transversely of said means in the region of said free ends and extending outwardly somewhat beyond each side of the fork, the magnetic pole piece together with the vibratory means constituting a substantially closed magnetic circuit, and means to create a regularly varying magnetic flux throughout said circuit, thereby to vibrate said means.

8. Motor apparatus comprising a rotary member, vibrating members arranged in the form of a tuning fork, motive means for vibrating the vibratory members and a plurality of belts, each of the belts being attached to a vibratory member at one end and yieldingly attached to a rigid support at the other end and extending in opposite directions at least partially around the rotary member intermediate the two ends so as continuously to rotate the rotary member.

Signed by me at Montreal, Quebec, Canada, this first day of December, 1916.

LESLIE R. McDONALD.